United States Patent
Qiu et al.

(10) Patent No.: US 9,465,779 B2
(45) Date of Patent: Oct. 11, 2016

(54) MICROBLOG-BASED DOCUMENT FILE SHARING METHOD AND DEVICE

(71) Applicant: Tencent Technology (Shenzhen) Company Limited, Shenzhen (CN)

(72) Inventors: Mingfeng Qiu, Shenzhen (CN); Juhong Wang, Shenzhen (CN); Zhengchan Chen, Shenzhen (CN); Wenhao Zhang, Shenzhen (CN); Zhizhi Zhou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 354 days.

(21) Appl. No.: 14/171,341

(22) Filed: Feb. 3, 2014

(65) Prior Publication Data
US 2014/0149853 A1 May 29, 2014

Related U.S. Application Data

(63) Continuation of application No. PCT/CN2013/072242, filed on Mar. 6, 2013.

(30) Foreign Application Priority Data

Mar. 26, 2012 (CN) .......................... 2012 1 0081899

(51) Int. Cl.
*G06F 17/00* (2006.01)
*G06F 17/22* (2006.01)
(Continued)

(52) U.S. Cl.
CPC ....... *G06F 17/2247* (2013.01); *G06F 17/3089* (2013.01); *G06F 21/55* (2013.01); *H04L 63/0428* (2013.01); *H04L 67/06* (2013.01)

(58) Field of Classification Search
CPC . G06F 17/3089; G06F 17/212; G06F 17/211
USPC ......... 715/234, 202, 760; 707/722, 737, 739
See application file for complete search history.

(56) References Cited

U.S. PATENT DOCUMENTS

2005/0193330 A1* 9/2005 Peters ................... G06F 17/211
715/230
2009/0252323 A1* 10/2009 Cooper ............... G06F 21/6218
380/54
(Continued)

FOREIGN PATENT DOCUMENTS

CN 101833567 A 9/2010
CN 102243665 A 11/2011
(Continued)

OTHER PUBLICATIONS

Japanese Office Action with English translation, dated Jan. 13, 2015, pp. 1-5, issued in corresponding Japanese Patent Application No. 2014-521944, Japanese Patent Office, Tokyo, Japan.
(Continued)

*Primary Examiner* — Mohammed-Ibrahim Zuberi
(74) *Attorney, Agent, or Firm* — Brinks Gilson & Lione

(57) ABSTRACT

Embodiments of the present invention provide a microblog-based document file sharing method and device. The method comprises: converting a document file into an swf file; performing format confusion on the swf file; and publishing the swf file after the format confusion through a microblog platform. After the embodiments of the present invention are applied, information transmission and the audience size are expanded through sharing via microblog technologies. In addition, the format confusion is performed on the swf file, so that the possibility of directly obtaining the original of the document file through a link is eliminated, and therefore, the information security of the document is also enhanced.

10 Claims, 4 Drawing Sheets

(51) Int. Cl.
    *G06F 17/30*     (2006.01)
    *G06F 21/55*     (2013.01)
    *H04L 29/06*     (2006.01)
    *H04L 29/08*     (2006.01)

(56) References Cited

U.S. PATENT DOCUMENTS

| | | | |
|---|---|---|---|
| 2010/0023849 A1* | 1/2010 | Hakim | H04L 12/6418 715/202 |
| 2010/0332959 A1* | 12/2010 | Mitchell | G06F 17/30056 715/202 |
| 2011/0035660 A1* | 2/2011 | Lussier | G06F 17/212 715/239 |
| 2011/0099376 A1 | 4/2011 | Gupta et al. | |
| 2011/0197237 A1 | 8/2011 | Turner | |
| 2011/0267645 A1* | 11/2011 | Miyazaki | G06F 3/1211 358/1.15 |
| 2012/0226823 A1* | 9/2012 | Livnat | G06F 21/10 709/246 |
| 2013/0031636 A1* | 1/2013 | Altschul | G06F 17/3089 726/26 |

FOREIGN PATENT DOCUMENTS

| | | |
|---|---|---|
| CN | 102254005 A | 11/2011 |
| JP | 2009146278 A | 7/2009 |
| KR | 20010069671 A | 7/2001 |
| WO | WO 2009/034718 A1 | 3/2009 |

OTHER PUBLICATIONS

Korean Office Action with English translation, dated Dec. 23, 2014, pp. 1-12, issued in corresponding Korean Patent Application No. 10-2014-7002299, Korean Intellectual Property Office, Daejeon, Republic of Korea.

Li Xin and Lin Daimao; "Copyrights Protection of Swf Files Based on Tags' Order;" Journal of Computer Research and Development; 2009; p. 31-36; vol. 46 (Suppl.); China Academic Journal Electronic Publishing House; China; in Chinese with English abstract.

International Search Report; dated Jun. 13, 2013, for corresponding continuation application, PCT/CN2013/072242, 4p.

* cited by examiner

| Microblog ID |
|---|
| Attach_type: Attach_id |

| Document ID |
|---|
| File_Path | though the technical solutions according to the embodiments of the invention will be described below in details with reference to the drawings and embodiments thereof.

MICROBLOG-BASED DOCUMENT FILE SHARING METHOD AND DEVICE

CROSS REFERENCE TO RELATED APPLICATION

This application is a continuation of International Application No. PCT/CN2013/072242, filed on Mar. 6, 2013, which claims priority to Chinese Patent Application No. 201210081899.5, filed with the Chinese Patent Office on Mar. 26, 2012 and entitled "MICROBLOG-BASED DOCUMENT FILE SHARING METHOD AND DEVICE", which are hereby incorporated by reference in their entirety.

FIELD OF THE DISCLOSURE

Embodiments of the present invention relates to the filed of microblog technologies and in particular to a microblog-based document file sharing method and device.

BACKGROUND OF THE DISCLOSURE

A microblog is a user relationship-based information sharing, propagation and retrieval platform. Over the microblog platform, a user can access web, WAP and various client components and update text information of approximately 140 words and have the information shared instantly.

In contrast to a blog for which a page layout is highlighted, the contents of a microblog are merely consisted of several simply words and phrases, and in view of this, there is a very low technical requirement threshold for a user, and its lingual arrangement and organization are less restricted than the blog. Various APIs enabled for the microblog enable a large number of users to update their own personal information instantly through a mobile phone, over a network, etc. The microblog has a strong grass-root nature and is widely distributed on various platforms including a desktop, a browser, a mobile terminal, etc., and there are coexisting numerous business patterns or multiple vertical sub-domains may come into being. User experience oriented characteristic and essential functions are indispensable in any of the business patterns.

In existing microblog technologies, a mechanism has been available to share picture and video files, but a mechanism to share a document file (e.g., PPT, DOC, PDF and other files) has been absent in the existing microblog. For document files in some formats, there are some online sharing applications currently available on the Internet. However, in these existing online sharing applications for the document file data, it may be possible to retrieve the original document file data directly through a link, thus incurring hidden insecurity of information for an enterprise.

Furthermore, the existing online sharing of document file data fails to be as rapid and popular with the audience as the microblog in socialized propagation.

SUMMARY OF THE DISCLOSURE

An embodiment of the invention proposes a microblog-based document file sharing method so as to improve both the propagation of a document and the security of document information.

An embodiment of the invention further proposes a microblog-based document file sharing device so as to improve both the propagation of a document and the security of document information.

Particular solutions of the embodiments of the invention are as follows:

A microblog-based document file sharing method includes:

converting a document file into an SWF file;

format-confounding the SWF file; and publishing the format-confounded SWF file over a microblog platform.

A microblog-based document file sharing device includes a format converting unit, a format confounding unit and a file publishing unit, wherein:

the format converting unit is configured to convert a document file into an SWF file;

the format confounding unit is configured to format-confound the SWF file; and the file publishing unit is configured to publish the format-confounded SWF file over a microblog platform.

A machine readable medium includes a set of instructions stored thereon, which enables upon being executed the machine to perform the microblog-based document file sharing method.

As can be seen from the foregoing technical solutions, in the embodiments of the invention, firstly a document file is converted into a SWF file; then the SWF file is format-confounded; and next the format-confounded SWF file is published over a microblog platform. As can be apparent, with an application of the embodiments of the invention, information propagation and the audience can be extended and therefore the propagation of the document is improved through sharing with use of microblog technology. Moreover the SWF file is format-confounded to avoid the possibility to retrieve original document file data directly through a link and consequently also enhance the information security of the document.

DETAILED DESCRIPTION

In order to make the objects, technical solutions and advantages of the invention more apparent, the invention will be further described below in details with reference to the drawings.

In embodiments of the invention, in view of the drawbacks in the prior art of poor propagation of a document file, insecurity of information, etc., the document file can be shared over the microblog social platform to thereby extend the sharing and the audience.

Moreover in an embodiment of the invention, the document file is converted into an SWF file, and the SWF file is format-altered. When a player requests for retrieving such an SWF file, a public key is allocated to the player, only the player with the public key can retrieve the SWF file, and the entire SWF file can be played only after being reversely altered, thereby improving the information security of the document.

Figures 1, 2:
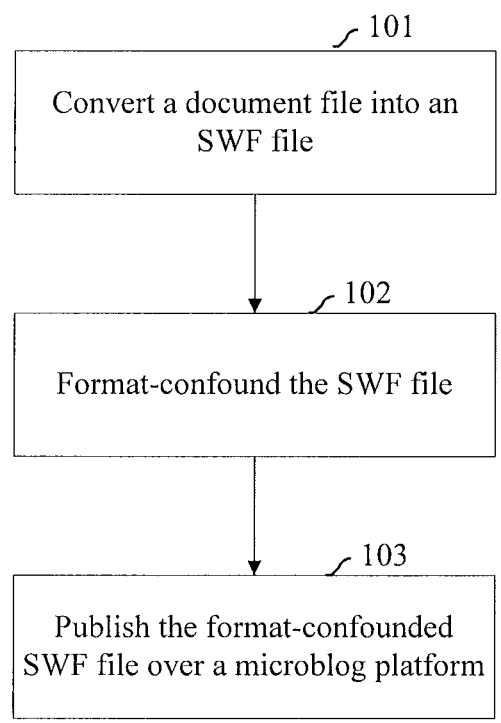
FIG. 1 is a flow chart of a microblog-based document file sharing method according to an embodiment of the invention.
FIG. 2 is a schematic comparative diagram of a microblog ID and a document ID according to an embodiment of the invention.

FIG. 1 is a flow chart of a microblog-based document file sharing method according to an embodiment of the invention.

As illustrated in FIG. 1, the method includes the following steps.

The step 101 is to convert a document file into an SWF file.

Here the document file can be converted into an SWF file in numerous ways.

Firstly the document file can be particularly a PDF file, a DOC file, a PPT file, an XLS file, a TXT file, etc.

Although some particular exemplary formats of the document file have been listed above, those skilled in the art can appreciate that a format of the document file will be neither limited to these listed particular forms nor limited to various document file formats defined by Microsoft Corp., but will be any document format with a text presentation or edition function.

The conversion process can be performed in various types of existing application software. With the FLASH Paper software installed, for example, a DOC file or another file can be dragged directly therein to generate an SWF file automatically.

In an embodiment of the invention, the document file can be converted directly into an SWF file; or firstly the document file can be converted into a file in an intermediate format, and then the file in the intermediate format can be converted into an SWF file.

For example, if the document files are a DOC file and a PPT file, then the DOC file and the PPT file can be converted separately into SWF files directly through corresponding format conversion facilities. Alternatively firstly the DOC file and the PPT file can be both converted into PDF files, and then the format of the PDF files can be converted into the SWF file format through the application software pdf2swf.

In an embodiment, a service to convert the format of the document file can be performed through multi-threading to decrease the waiting time.

For example, the document file can be converted into the SWF file through N threads.

Where N=(X/10)>5?5:(X/10), and X represents the number of pages of the document file.

As commonly used in the art, the ternary operator "?" generally used in the form of "condition?value 1:value 2", defines a logic operation in which: the value 1 is adopted in the case that the condition is true, while the value 2 is adopted in the case that the condition is not true.

As for N=(X/10)>5?5:(X/10), N is assigned with the value 5 in the case of (X/10)>5, or is assigned with the value X/10 in the case of (X/10)≤5.

The respective threads convert the pages of the document numbered $X_1, X_2, \ldots, X_n$ respectively, where $X_1 \bmod N=0$, $X_2 \bmod N=1, \ldots, X_n \bmod N=N-1$.

Thus the conversion speed can be improved by a factor of N due to the multiple concurrent threads.

In a practical application, a user can firstly click document file(s) in a microblog publishing box and select to upload the local document file(s) to a microblog platform, and the microblog platform can convert the document file(s) into SWF file(s).

After the user uploads the local document file(s) to the microblog platform by publishing a microblog, a database of the microblog platform stores temporary data of the microblog and binds a mapping relationship of the document file(s) uploaded by the user with the temporary data of the microblog.

Preferably the microblog platform can be an enterprise microblog platform so that an enterprise can propagate and publish document files.

FIG. 2 is a schematic comparative diagram of a microblog ID and a document ID according to an embodiment of the invention.

As illustrated in FIG. 2, for example, the value of an Attach_id field in an entry of a microblog data table is 456, and the Attach_id field will correspond to an entry with an ID field valued 456 in a document data table, so that a path to a document file (File_Path) can be located successfully.

The step 102 is to format— the SWF file.

Here the original SWF file format is a dedicated format of the animation designing software FLASH, which is an animation file format supporting vector graph and bitmap and widely applied to the fields of webpage designing, animation production, etc. The SWF file is also typically referred to as a FLASH file. The SWF file can be opened by Adobe FLASH Player or a browser installed with an Adobe FLASH Player plug-in.

A header of the SWF file is in the format as depicted in Table 1 below:

TABLE 1

| Field | Type * | Description |
| --- | --- | --- |
| Signature ID | UI8 | ID field: "F" represents Uncompressed "C" represented Compressed (Version 6 or later) |
| Signature ID | UI8 | This ID is typically "W" |
| Signature ID | UI8 | This ID is typically "S" |
| Version | UI8 | single-byte Version number of the file (e.g., 0x06 represents Version 6) |
| File length | UI32 | The length in bytes of the entire file |
| Frame size | RECT | The size of a unit frame |
| Frame rate | UI16 | The number of frames per second, in which 16 bits represented in the format 8.8 |
| Number of frames | UI16 | The total number of frames of a video |

In an embodiment of the invention, the SWF file is format-confounded by firstly performing an XOR operation on the header of the SWF file and then appending a pseudo SWF header and a random string in front of the header of the SWF file subjected to the XOR operation.

Figure 5:
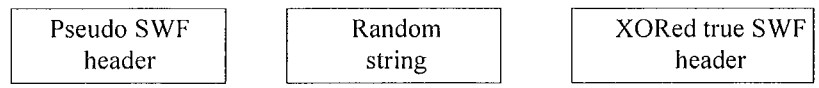
FIG. 5 is a schematic diagram of the construct of a header of an SWF file according to an embodiment of the invention.

FIG. 5 is a schematic diagram of the construct of a header of an SWF file according to an embodiment of the invention.

As can be apparent from FIG. 5, a pseudo SWF header and a random string are inserted to the header of the SWF file in place of the original SWF header to construct the entire SWF file.

The step 103 is to publish the format-confounded SWF file over a microblog platform.

After the step 101 and the step 102 are performed, that is, after the document file is successfully format-converted and format-confounded, the microblog platform can send out a signal indicating successful background conversion, update the temporal microblog data to formal data and write it into a microblog database and thereafter upload the format-confounded SWF file formally by publishing the microblog and send the user a message prompting the availability of online preview.

Furthermore in this method, the user downloads the format-confounded SWF file over the microblog platform; and then reversely alters the SWF file through the FLASH player in the browser and plays the reversely altered SWF file.

Moreover the user can download the format-confounded SWF file over the microblog platform by requesting the microblog platform to allocate a public key; receiving the public key returned from the microblog platform; sending a key generated from a private key and the returned public key to the microblog platform jointly; and receiving the format-confounded SWF file from the microblog platform after the key has been authenticated by the microblog platform.

Specifically reversely altering the SWF file can include removing the pseudo SWF header; removing the random string by the length of the random string; and performing another XOR operation to derive the original header of the SWF file.

With such a series of processes, the FLASH player can process and play each SWF file.

Format-conversion of the document file described in the step 101 can be performed instantly by the microblog platform or can be timed on the microblog platform to be performed.

After the temporary data of the microblog is stored successfully, the microblog platform can send a format conversion request to a conversion background server, and the conversion background server can initiate a process for an instant conversion service. Of course, the conversion background server can alternatively perform a task to detect timed conversion and convert again a document for which instant conversion has failed to eliminate the probability of instant conversion failing due to some unpredictable factor (e.g., the service request timing out, an instable network, code abnormality, etc).

A status code of the document file can be preset. For example, the status code 2 of the document file indicates successful format conversion; the status code 1 of the document file indicates no format conversion; and the status code −1 of the document file indicates format conversion failing.

Figure 3:
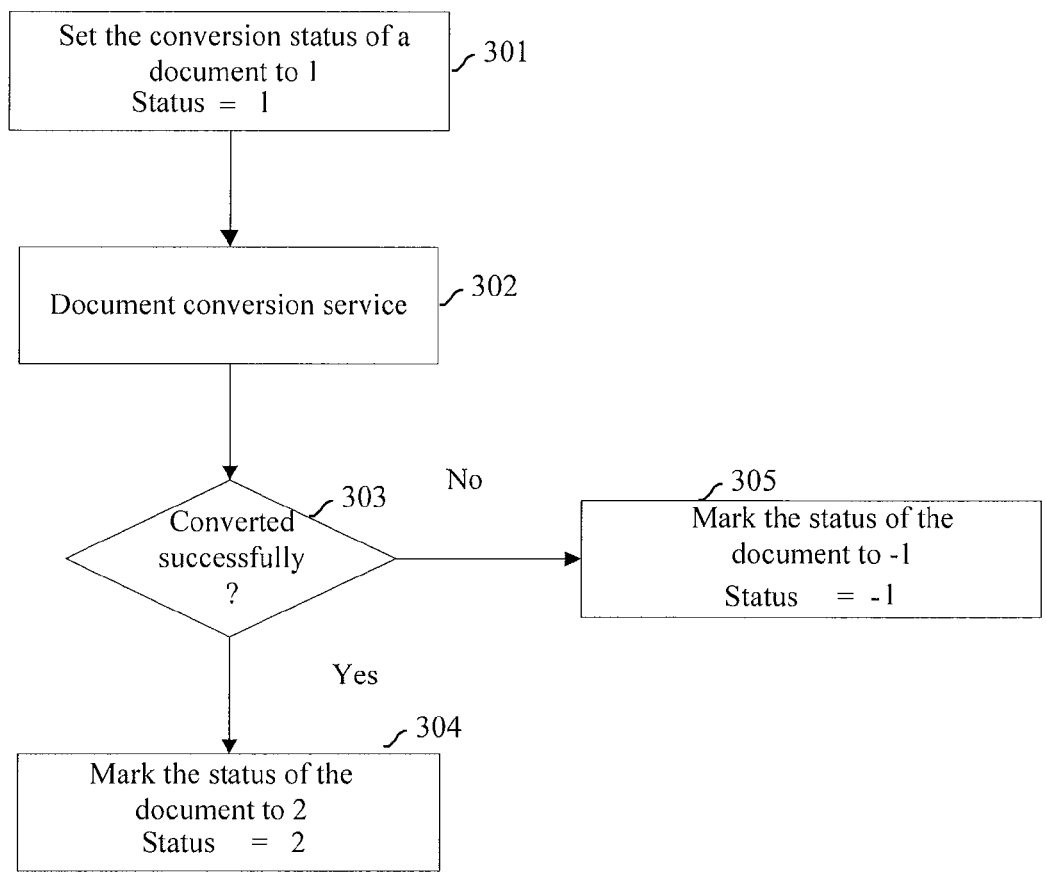
FIG. 3 is a flow chart of an instant document conversion task according to an embodiment of the invention.

FIG. 3 is a flow chart of an instant document conversion task according to an embodiment of the invention.

As illustrated in FIG. 3, this method includes steps 301-305.

The step 301 is to set the conversion status of a document file to 1.

The step 302 is to format-convert the document file.

The step 303 is to determine whether format conversion of the document file has succeeded, and if succeeded, to proceed to the step 304 and terminate the flow; if not succeeded, to proceed to the step 305 and terminate the flow;

The step 304 is to mark the status of the document file to 2.

The step 305 is to mark the status of the document file to −1.

Figure 4:
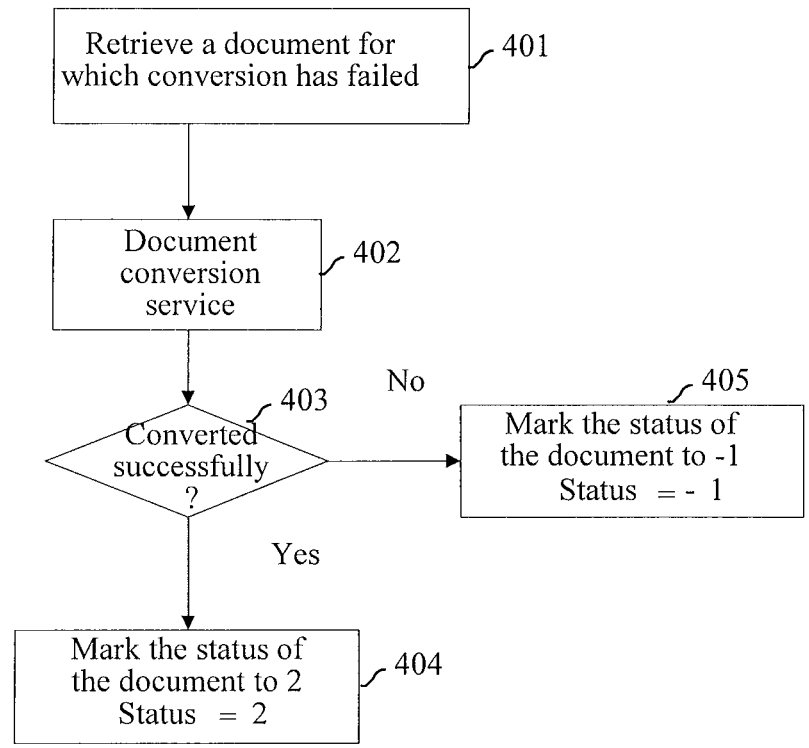
FIG. 4 is a flow chart of a timed document conversion task according to an embodiment of the invention.

FIG. 4 is a flow chart of a timed document conversion task according to an embodiment of the invention.

The timed document conversion task can convert again a document for which instant conversion has failed, to improve the probability of successful conversion.

As illustrated in FIG. 4, this method includes steps 401-405.

The step 401 is to retrieve a document for which conversion has failed. Here a document in a status marked to −1 is retrieved.

The step 402 is to perform a document conversion service on the document.

The step 403 is to determine whether format conversion of the document file has succeeded, and if succeeded, to proceed to the step 404 and terminate the flow; if not succeeded, to proceed to the step 405 and terminate the flow;

The step 404 is to mark the status of the document file to 2.

The step 405 is to mark the status of the document file to −1.

After the format-converted and format-confounded SWF file is uploaded to a microblog platform, a user can download and display the document file.

Online browsing of a document in a microblog needs to be performed through a FLASH player, and the player needs to request for the SWF file, download the SWF file and reversely alter the SWF file into the original file in order for successful parsing and consequential online browsing.

In order to enhance the information security of the document file, the file is preferably downloaded and displayed in a handshaking-like protocol and by allocating a one-time key in an embodiment of the invention.

Figure 6:
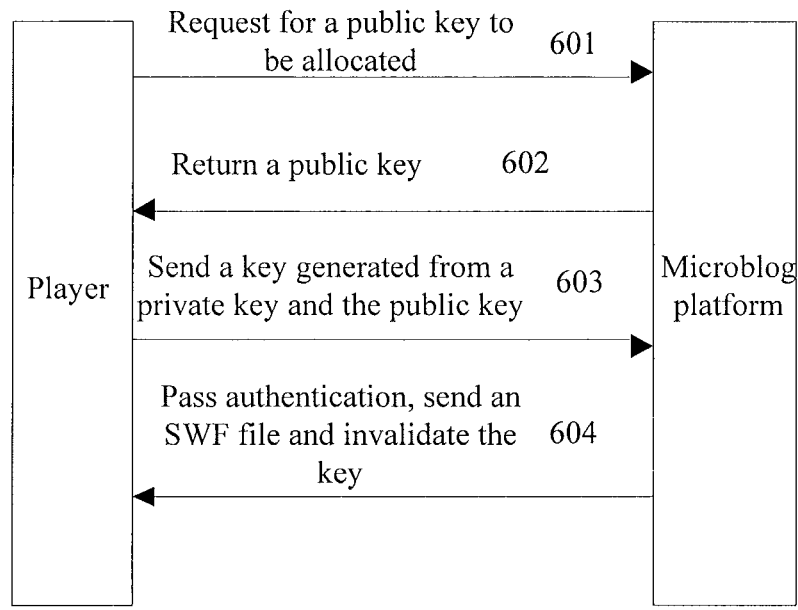
FIG. 6 is a schematic flow chart of allocating a key according to an embodiment of the invention.

FIG. 6 is a schematic flow chart of allocating a key according to an embodiment of the invention.

As illustrated in FIG. 6, this method includes steps 601-604.

In the step 601, a player sends a document file download request to a microblog platform to request for a document file to be downloaded and requests for a public key to be allocated.

In the step 602, the microblog platform returns a public key to the player.

In the step 603, the player generates a key from the public key and its own stored private key and sends the key to the microblog platform for authentication.

In the step 604, the microblog platform authenticates the key, sends an SWF file to the player and invalidates the key.

After downloading the SWF file, the player further reversely alters the SWF file and plays the reversely altered SWF file. A reverse alteration procedure can include removing a pseudo header; removing a random string by the length of the random string; performing another XOR operation to derive a true header of the SWF file; etc. Here a document file in the PPT format can be further converted into the SWF format based upon the ISPING technology to achieve the effect of animation playing.

Based upon the foregoing detailed description, an embodiment of the invention further provides a document file sharing device.

Figure 7:
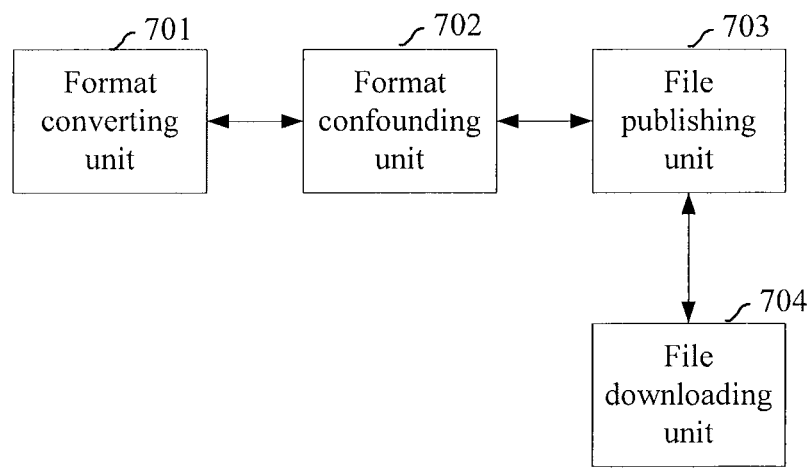
FIG. 7 is a schematic structural diagram of a microblog-based document file sharing device according to an embodiment of the invention.

FIG. 7 is a schematic structural diagram of a microblog-based document file sharing device according to an embodiment of the invention.

As illustrated in FIG. 7, the device includes a format converting unit 701, a format confounding unit 702 and a file publishing unit 703.

The format converting unit 701 is configured to convert a document file into an SWF file;

The format confounding unit 702 is configured to format-confound the SWF file; and The file publishing unit 703 is configured to publish the format-confounded SWF file over a microblog platform.

In an embodiment, the format confounding unit 702 is configured to perform an XOR operation on a header of the SWF file and to append a pseudo SWF header and a random string in front of the header of the SWF file subjected to the XOR operation.

Moreover the format converting unit 701 is configured to convert the document file into the SWF file through N threads, where N=(X/10)>5?5:(X/10), and X represents the number of pages of the document file.

Preferably the device further includes a file downloading unit 704; and

The file downloading unit 704 is configured to download the format-confounded SWF file over the microblog platform, to reversely alter the SWF file and to play the reversely altered SWF file.

In an embodiment, the file downloading unit 704 is configured to request for a public key to be allocated from the microblog platform; to receive the public key returned from the microblog platform; to send a key generated from a private key and the returned public key collectively to the microblog platform; and to receive the format-confounded SWF file from the microblog platform after the key has been authenticated by the microblog platform.

The document file can be particularly a PDF file, a DOC file, a PPT file, an XLS file, a TXT file, etc.

Although some particular exemplary formats of the document file have been listed above, those skilled in the art can appreciate that a format of the document file will be neither limited to these listed particular forms nor limited to various document file formats defined by Microsoft Corp., but will be any document format with a text presentation or edition function.

An embodiment of the invention further provides a microblog-based document file sharing device including: a memory configured to store instructions; and a processor coupled with the memory. The processor is configured to execute the instructions stored in the memory and to perform the foregoing various embodiments of the microblog-based document file sharing method. Moreover an embodiment of the invention further provides a machine readable medium with a set of instructions stored thereon, which enables upon being executed a machine to perform the foregoing various embodiments of the microblog-based document file sharing method.

As can be seen from the foregoing technical solutions, in the embodiments of the invention, firstly a document file is converted into a SWF file; then the SWF file is format-confounded; and next the format-confounded SWF file is published over a microblog platform. As can be apparent, with an application of the embodiments of the invention, information propagation and the audience can be extended and therefore the propagation of the document is improved through sharing with use of microblog technology. Moreover the SWF file is format-confounded to avoid the possibility to retrieve original document file data directly through a link and consequently also enhance the information security of the document.

The foregoing description is merely illustrative of preferred embodiments of the invention but not intended to limit the scope of the invention. Any modifications, equivalent substitutions, adaptations, etc., made thereto without departing from the spirit of the invention shall come into the scope of the invention.

The invention claimed is:

1. A micro-blog based document file sharing method for sharing a document file by a microblog platform, the method comprising:
    converting the document file into an SWF file;
    format-confounding the SWF file; and
    publishing the format-confounded SWF file over the microblog platform,
    wherein format-confounding the SWF file comprises:
    performing an XOR operation on a header of the SWF file; and
    appending a pseudo SWF header and a random string in front of the header of the SWF file subjected to the XOR operation.

2. The method of claim 1 further comprises:
    in response to receiving a request from a user to download the format-confounded SWF file transmitting to the user an allocated public key.

3. The method of claim 2 further comprises in response to receiving a private key and the allocated public key from the user, causing the download of the format-confounded SWF file to the user in response to authenticating the private key.

4. The microblog-based document file sharing method according to claim 1, wherein the method further comprises:
    downloading the format-confounded SWF file over the microblog platform to a user.

5. The method according to claim 1, wherein converting the document file is in response to receiving the document file in a format corresponding to a PDF file, a DOC file, a PPT file, an XLS file or a TXT file.

6. A microblog-based document file sharing device, the device comprising a format converting unit, a format confounding unit and a file publishing unit, wherein:
    the format converting unit is configured to convert a document file into an SWF file;
    the format confounding unit is configured to format-confound the SWF file; and
    the file publishing unit is configured to publish the format-confounded SWF file over a microblog platform,
    wherein, the format confounding unit is configured to perform an XOR operation on a header of the SWF file and to append a pseudo SWF header and a random string in front of the header of the SWF file subjected to the XOR operation.

7. The device according to claim 6, wherein the device further comprises a file downloading unit; and
    the file downloading unit is configured to download the format-confounded SWF file over the microblog platform, to reversely alter the SWF file and to play the reversely altered SWF file.

8. The device according to claim 7, wherein the file downloading unit is configured to request for a public key to be allocated from the the microblog platform; to receive the public key returned from the microblog platform; to send a key generated from a private key and the returned public key collectively to the microblog platform; and to receive the format-confounded SWF file from the microblog platform after the key has been authenticated by the microblog platform.

9. The device according to claim 6, wherein the document file is a PDF file, a DOC file, a PPT file, an XLS file or a TXT file.

10. A non-transitory machine readable storage medium, with a set of instructions stored thereon, the set of instructions enabling upon being executed a machine to perform a microblog-based document file sharing method, wherein the microblog-based document file sharing method comprises:
    converting a document file into an SWF file;
    format-confounding the SWF file; and
    publishing the format-confounded SWF file over a microblog platform, wherein format-confounding the SWF file comprises:

performing an XOR operation on a header of the SWF file; and appending a pseudo SWF header and a random string in front of the header of the SWF file subjected to the XOR operation.

* * * * *